United States Patent [19]

May

[11] Patent Number: 4,768,771
[45] Date of Patent: Sep. 6, 1988

[54] SHEET FEEDER WITH RETRACTABLE GATE

[75] Inventor: Joseph N. May, Fairport, N.Y.

[73] Assignee: Xerox Corporation, Stamford, Conn.

[21] Appl. No.: 403,594

[22] Filed: Aug. 2, 1982

[51] Int. Cl.$^4$ ............................................. B65H 3/52
[52] U.S. Cl. .................................... 271/121; 271/124; 271/167
[58] Field of Search ............... 271/245, 246, 247, 236, 271/243, 237, 275, 235, 239, 121, 124, 167, 274, 137, 138

[56] References Cited

U.S. PATENT DOCUMENTS

| | | | |
|---|---|---|---|
| 1,609,235 | 11/1926 | Wycherley et al. | |
| 2,221,153 | 11/1940 | Sanford | |
| 3,118,663 | 1/1964 | Logan | 271/35 |
| 3,630,519 | 12/1971 | Spear, Jr. | 271/246 |
| 3,888,478 | 6/1975 | Alderman, Jr. et al. | 271/8 R |
| 4,023,791 | 5/1977 | Hori | 271/246 |
| 4,072,306 | 2/1978 | Idstein | 271/3 |
| 4,135,804 | 1/1979 | Schoppe et al. | 355/3 SH |

OTHER PUBLICATIONS

IBM Technical Disclosure Bulletin, vol. 20 No. 4, Sept. 1977, (Froula et al.), p. 1294.
Xerox Disclosure Journal, vol. 4, No. 2, Mar./Apr. 1979, pp. 213,214 (Adamek et al.).
IBM Technical Disclosure Bulletin, vol. 23, No. 5, Oct. 1980 (Grebner et al.).

Primary Examiner—Joseph J. Rolla

[57] ABSTRACT

A device for feeding successive sheets without overlapping the sheets includes a loading chute having a recess formed therein at the exit end for guiding individual sheets, a pivotally mounted retractable gate at the exit end of the chute which when in the closed position extends into the chute recess, means to retract the gate so that a sheet may be fed from the chute including means to release the gate from the retracted position after the leading edge of the sheet has passed the closed position of the gate and before the trailing edge of the sheet has passed the closed position of the gate. The release permits the gate to float against the sheet in the recessed portion of the chute so that when the trailing edge of the sheet being fed passes under the gate, the gate drops of its own weight into the recess thereby blocking passage of the next sheet. In a preferred embodiment the loading chute is inclined to the horizontal.

9 Claims, 7 Drawing Sheets

FIG. 7b

SHEET FEEDER WITH RETRACTABLE GATE

REFERENCE TO RELATED APPLICATIONS

Reference is hereby made to copending application Ser. No. 403,602 entitled Multimode Document Handling Apparatus and Reproducing Apparatus Containing Same filed concurrently herewith in the name of Joseph N. May and Joseph M. Wing, now U.S. Pat. No. 4,508,444.

BACKGROUND OF THE INVENTION

This invention relates to a device for feeding successive sheets without overlapping the sheets. In particular, the present invention relates to a pivotally mounted retractable gate arrangement positioned at the exit end of a feeding chute when in the closed position for use in an automatic reproducing apparatus.

In the electrostatographic reproducing apparatus commonly in use today, a photoconductive insulating member is typically charged to uniform potential and thereafter exposed to a light image of an original document to be reproduced. The exposure discharges the photoconductive insulating surface in exposed background areas and creates an electrostatic latent image on the member which corresponds to the image areas contained within the usual document. Subsequently, the electrostatic latent image on the photoconductive insulating layer is made visible by developing the image with developing powder referred to in the art as toner. Most development systems employ development material which comprise both charged carrier particles and charged toner particles which triboelectrically adhere to the carrier particles. During development, the toner particles are attracted from the carrier particles by the charged pattern of the image areas on the photoconductive insulating area to form a powder image on the photoconductor. This may subsequently be transferred to a support surface such as copy paper to which it may be permanently affixed by heating or by the application of pressure.

Many commercial machines provide reproducing capability through the use of a moving document platen which is reciprocated back and forth across the imaging platen to make one or more multiple copies. Book copying capability is also available in such devices merely by placing a book on the moving platen. Moving platen machines suffer from the deficiency in that they are not capable of stream feeding documents and therefore an inordinate length of time is necessary to copy a multi page document, for example, since for each copy the platen must be manually loaded, transported back and forth across the imaging platen and the document manually removed before the next document may be placed on the platen. In addition, moving platen machines typically take up a relatively large floor area since the moving platen frequently extends beyond the frame of the machine. Furthermore, a safety hazzard may potentially arise with the moving platen machines since the platens are driven beyond the frame of the machine in that the operator or passerby may be struck by this moving apparatus.

Stationary platen moving optics machines are also available commercially. The Xerox 3100 family of products are exemplary. In the Xerox 3107, for example, a document may be fed to the stationary platen where it is scanned with a moving optical system. In small copiers moving optical systems are comparatively expensive and take up a relatively large volume of space, thereby increasing the perceived size of the machine. In addition, while the Xerox 3107 is capable of stream feeding, it is possible for the operator to place the second document in the document feeder too soon after the first document has been placed thereby overlapping the documents.

PRIOR ART

U.S. Pat. No. 2,221,153 (Sanford) illustrates a sheet feeder with a movable stop means which can be used to intercept a sheet. It includes a detector finger and a baffle upstream of the detector finger pivoted about a central point. When no sheet is present in the feeder the finger pivots down into a cut out portion below the sheet feeding level thereby raising the baffle on the other end permitting a sheet to be fed. When the sheet reaches the detector finger, it raises the finger and leaves the baffle thereby stopping the feeding for a successive sheet.

U.S. Pat. No. 3,888,478 (Alderman, Jr. et al) describes a sheet limiter or feed control mechanism with a stop which is selectively movable into the sheet feed path to direct the leading edge of a sheet against a stop surface while a previously inserted sheet continues to be fed forward.

U.S. Pat. No. 3,118,663 (Logan) describes a spring gate which rides a moving sheet and drops to stop forward motion of successive sheets until the gate is reopened.

SUMMARY OF THE INVENTION

In accordance with the present invention a sheet feeding device is provided. The device which comprises one for feeding successive sheets without overlapping the sheets comprises a sheet loading chute for supporting and guiding individual sheets, said loading chute comprising a sheet support bottom having a recess formed therein at the exit end of the chute, and a pivotally mounted retractable gate means at the exit end of the chute which when in the closed position extends into the chute recess. The sheet feeding device also includes means to retract the gate so that the sheet may be fed from the chute including means to release the gate from the retracted position after the leading edge of the sheet has passed the closed position of the gate and before the trailing edge of the sheet has passed the closed position of the gate. This releasing means permits the gate to float against the sheet in the recessed portion of the chute so that when the trailing edge of the sheet being fed passes under the gate, the gate drops of its own weight into the recess thereby blocking passage of the next sheet.

In a specific aspect of the present invention the loading chute is vertically inclined to the horizontal in a downward direction so that the sheet fed out is at the lower end of the chute.

In another aspect of the present invention the loading chute is oriented substantially horizontally.

In a further object of the present invention means are provided to isolate the rotational drive of the gate shaft from the gate to allow the gate to float on a sheet in the chute.

Accordingly it is an object of the present invention to provide a novel sheet feeding device.

It is a further object of the present invention to provide a sheet feeding device which prohibits successive sheets that are being fed from overlapping.

It is a further object of the present invention to provide a sheet feeding device which has a gate floating on the trailing edge of a sheet being fed until it is fed and in blocking engagement with the next sheet to be fed.

It is a further object of the present invention to provide a sheet feeding device with improved operator convenience.

It is a further object of the present invention to provide a sheet feeding apparatus wherein stream feeding of documents in an efficient manner without overlapping successive documents may be achieved.

For a better understanding of the invention as well as other objects and further features thereof, reference is had to the following drawings and description.

DESCRIPTION OF PREFERRED EMBODIMENT

The invention will now be described by reference to a preferred embodiment of the multimode document feeding apparatus.

Figure 1:
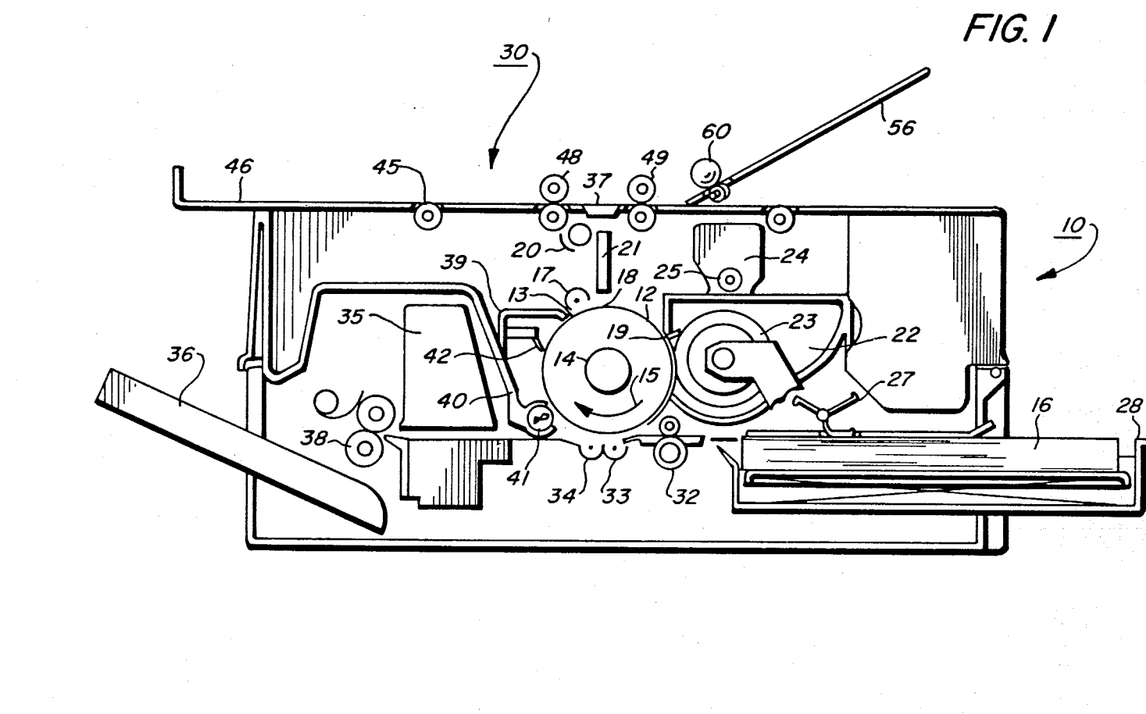
FIG. 1 is a schematic representation in cross section of the operational elements of an automatic reproducing machine incorporating the multimode document handling apparatus of the present invention.

Referring now to FIG. 1 there is shown by way of example the operational element organizational geometry of an automatic xerographic reproducing machine 10 which may use the present invention. The reproducing machine 10 depicted in FIG. 1 illustrates the various operational elements and components utilized for producing copies from an original document. Although the apparatus of the present invention is particularly well adapted for use in an automatic xerographic reproducing machine 10, it should become evident from the following description that it is equally well suited for use in a wide variety of processing systems including other electrostatographic systems and it is not necessarily limited in the application to the particular embodiment or embodiments shown herein.

The reproducing machine 10, illustrated in FIG. 1 employs an image recording drum-like member 12, the outer periphery of which is coated with a suitable photoconductive material 13. The drum 12 is suitably journaled for rotation within a machine frame (not shown in this Figure) by means of shaft 14 and rotates in the direction indicated by arrow 15 to bring the image-bearing surface 13 thereon past a plurality of xerographic processing stations. Suitable drive means (not shown) are provided to power and coordinate the motion of the various cooperating machine components whereby a faithful reproduction of the original input scene information is recorded upon a sheet of final support material 16 such as paper or the like.

Initially, the drum 12 moves the photoconductive surface 13 through a charging station 17 where an electrostatic charge is placed uniformly over the photoconductive surface 13 in known manner preparatory to imaging. Thereafter, the drum 12 is rotated to exposure station 18 where the charged photoconductive surface 13 is exposed to a light image of the original input scene information whereby the charge is selectively dissipated in the light exposed regions to record the original input scene in the form of an electrostatic latent image. At the exposure station, the image received on the drum is one which is formed by illuminating the document by exposure lamp 20 and transmitting the image through lens assembly 21 to the photoconductive surface. The lens assembly 21 comprises a bundled array of gradient index optical fibers which are produced under the trade name "SELFOC" in Japan by Nippon Sheet Glass Co., Ltd. and which are described in U.S. Pat. No. 3,658,407 to Kitano et al. After exposure, drum 12 rotates the electrostatic latent image recorded on the photoconductive surface 13 to development station 19 wherein a conventional developer mix is applied to the photoconductive surface of the drum 12 rendering the latent image visible. Typically a suitable development station could include a developer housing 22, a magnetic brush development roll 23 utilizing a magnetizable developer mix having coarse ferromagnetic carrier granules and toner colorant particles which is dispensed from dispenser 24 by dispenser roll 25.

Sheets 16 of the final support material are supported in a stack arrangement on an elevating stack support tray 28. With the stack at its elevated position a sheet separator feed paddle wheel 27 feeds individual sheets therefrom to the registration system 32. The sheet is then forwarded to the transfer station 33 in proper registration with the image on the drum. The developed image on the photoconductive surface 13 is brought into contact with the sheet 16 of final support material within the transfer station 33 and the toner image is transferred from the photoconductive surface 13 to the contacting side of the final support sheet 16. Following transfer of the image the final support material which may be paper, plastic, etc., as desired is transported through detack station where detack corotron 34 uniformly charges the support material to separate it from the drum 12.

After the toner image has been transferred to the sheet of final support material 16 the sheet with the image thereon is advanced to a suitable fuser 35 which coalesces the transferred powder image thereto. After the fusing process the sheet 16 is advanced to a suitable output device such as tray 36 by output rolls 38.

Although a preponderance of toner powder is transferred to the final support material 16, invariably some residual toner remains on the photoconductive surface 13 after the transfer of the toner powder image to the final support material. The residual toner particles remaining on the photoconductive surface 13 after the transfer operation are removed from the drum 12 as it moves through a cleaning station 39 which includes cleaner housing 40 and auger 41. The toner particles may be mechanically cleaned from the photoconductive surface 13 by any conventional means as, for example, by the use of a cleaning blade 42.

As will be described in greater detail hereinafter, as the document is transported past the optical system, the copy sheet is delivered to the transfer station at the same speed so that a faithful reproduction may be obtained. This is accomplished through the use of a continuously rotating paddle wheel feeder 27 which drives successive sheets from a stack into the registration system 32 which first registers the sheets and then drives them forward at a speed synchronized to that of the document transport.

It is believed that the foregoing general description is sufficient for purposes of the present application to illustrate the general operation of an automatic xerographic copier 10 which can be used in the apparatus in accordance with the present invention.

With continued reference to FIG. 1 and additional reference to FIGS. 2-5, the multimode document handling apparatus 30 will be described in greater detail. As may be observed, with reference to FIG. 3, the document handling apparatus of the present invention has operational components that are contained within an upper frame portion 40 and a lower base frame portion 41. The lower base frame portion also houses the principle components in the reproducing apparatus which was previously described while the upper frame portion comprises the platen cover together with several operational components of the document handler.

Figure 2:
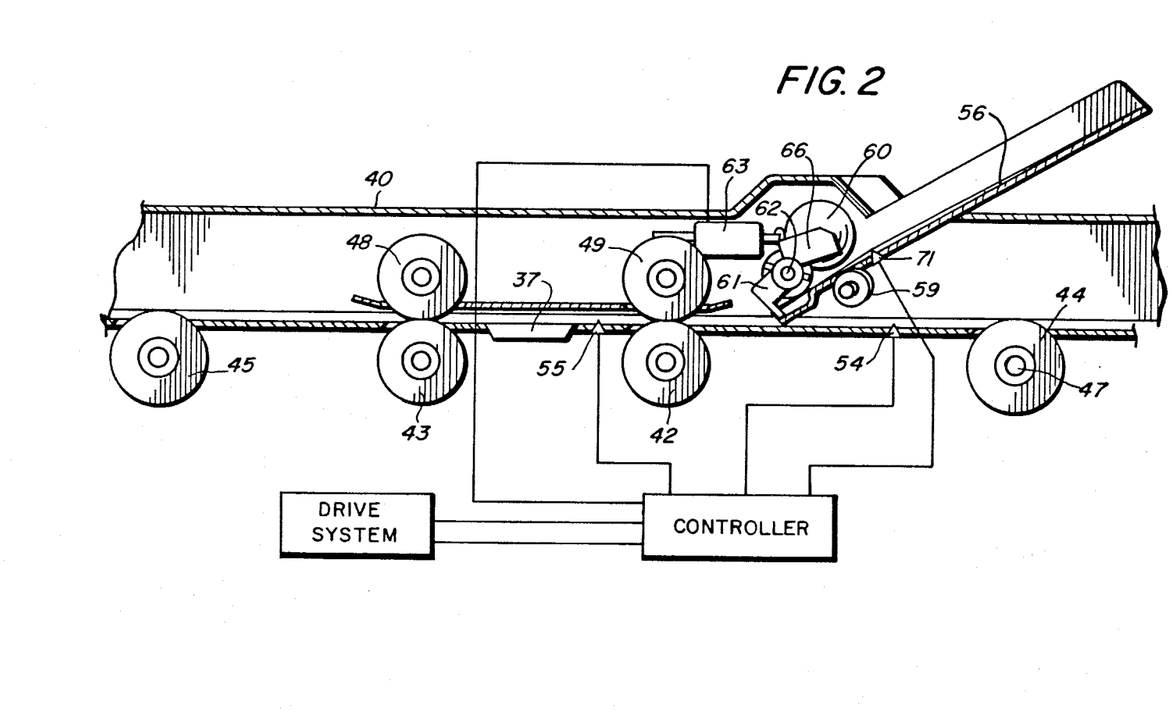
FIG. 2 is an enlarged side sectional view of the document handling apparatus of the present invention.
Figure 3:
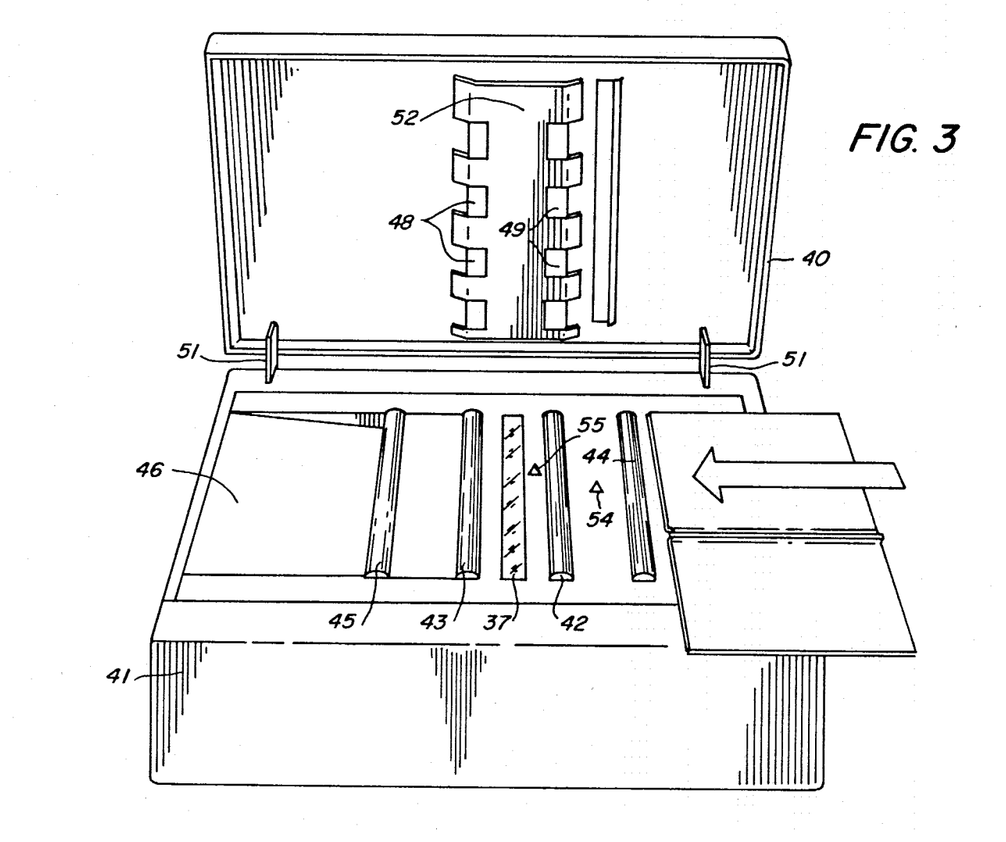
FIG. 3 is an isometric view with the top frame portion in the up position showing how the drive systems cooperate.

As may be seen with particular reference to FIG. 2, the document transport system provides a multimode capability. Briefly a document may be loaded in chute 56 transported across imaging platen 37 to make a single copy. If multiple copies are desired the transport rolls 42-44 are reversed and the document is driven straight back across the viewing platen 37 without going up the inclined chute 56. In this way a subsequent document can be loaded in the chute in preparation for copying. If copying from a book is desired, the platen which is hinged at the rear is pivoted up. The book is placed on the roller 44, manually held against the transport rolls which transport the book across the viewing platen 37.

The lower base frame 41 comprises driven transport rolls 42 and 43 on either side of the imaging platen which are capable of being driven in either direction by means not shown. In addition transport roll 44 which is located further upstream of transport roll 42 and the exit of chute 56 in the substantially horizontal path of the transport rolls is also driven in both directions by means not shown. Transport roll 44 however has an overrunning clutch 27 so that it may be manually moved faster in a counterclockwise direction when a book is placed on the roll to be transported to the imaging platen 37. The lower base frame portion also includes a driven exit roll 45 which is also capable of being driven in both directions which drives a copied document into document restack tray 46. The lower frame portion also includes two sensors to help control the automatic machine. Registration sensor 55, which is positioned upstream of the imaging platen and downstream of the transport roll 42 senses the lead edge of the document being fed to the imaging platen 37 and activates the paper feeder 27 so that a copy sheet 16 is synchronously fed to the imaging drum. In addition sensor 54 which is positioned upstream of the inclined chute exit into the substantially horizontal document path activates the transport rolls when in the book copying mode of operation.

The top frame portion 40 which includes the platen cover is pivotally mounted to the rear edge of the base frame portion at hinges 51 and houses idler rolls 48, 49 which are spring biased into feeding engagement with transport rolls 43 and 42 respectively, to provide a positive drive of the document being copied across the imaging platen 37. A foam pad 52 that floats above the platen in the top frame portion insures that a document being copied is kept flat on the imaging platen. The document loading chute 56 is vertically inclined to the horizontal and has an exit portion which is in operative communication with the horizontal transport means and intersects the horizontal transport upstream of the first set of transport rolls on the upstream side of the imaging platen. The angle of the chute relative to the substantially horizontal transport plane while not critical should be sufficient to maximize ease of operator loading documents into the chute. Typically this angle is of the order of 15° to 35°. The document loading chute 56 comprises a sheet support bottom 58 having a recessed portion 57 at its exit end which is lower than the level of the sheet support bottom and through which the retractable gate 61 extends when in the closed position.

Figure 7A:
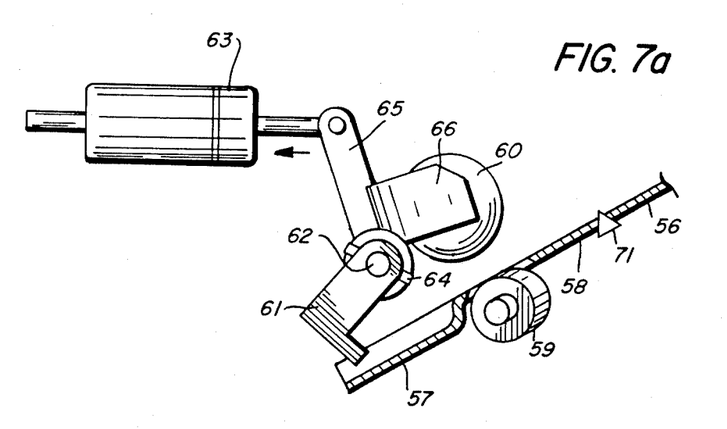
FIG. 7a and 7b are enlarged side views showing the gate in the closed and retracted position respectively.
Figure 7B:
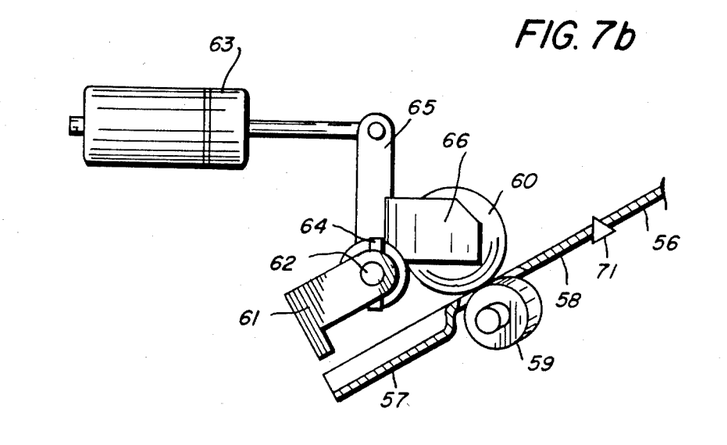

Contained in the top frame above the inclined loading chute are a pivotally mounted retractable gate 61 at the exit, a side registration aid comprising a bottom stationary drive roll 59 whose top is in the plane of the sheet support bottom 58 and in pressure contact with idler ball 60 so that when the roll/ball combination is in contact a document therebetween will be fed forward. In addition, this roll/ball combination is positioned to drive a document to the rear of the document handler and register the rear edge along a registration edge not shown. A solenoid 63 is connected to gate 61 through gate shaft 62 and linkage 65 and also to supporting cup 66 for registration ball 60 through shaft collar 67. This enables the solenoid to control both gate opening and closing as well as activating and inactivating the side registration aid in that when the gate is open the registration aid is activated by lowering the idler ball into contact with the drive roll and when the gate is in the closed position, the registration aid is inactivated by raising the idler ball from contact with the drive roll. The gate closed and open position are illustrated in FIGS. 7a and 7b respectively.

Figure 5:
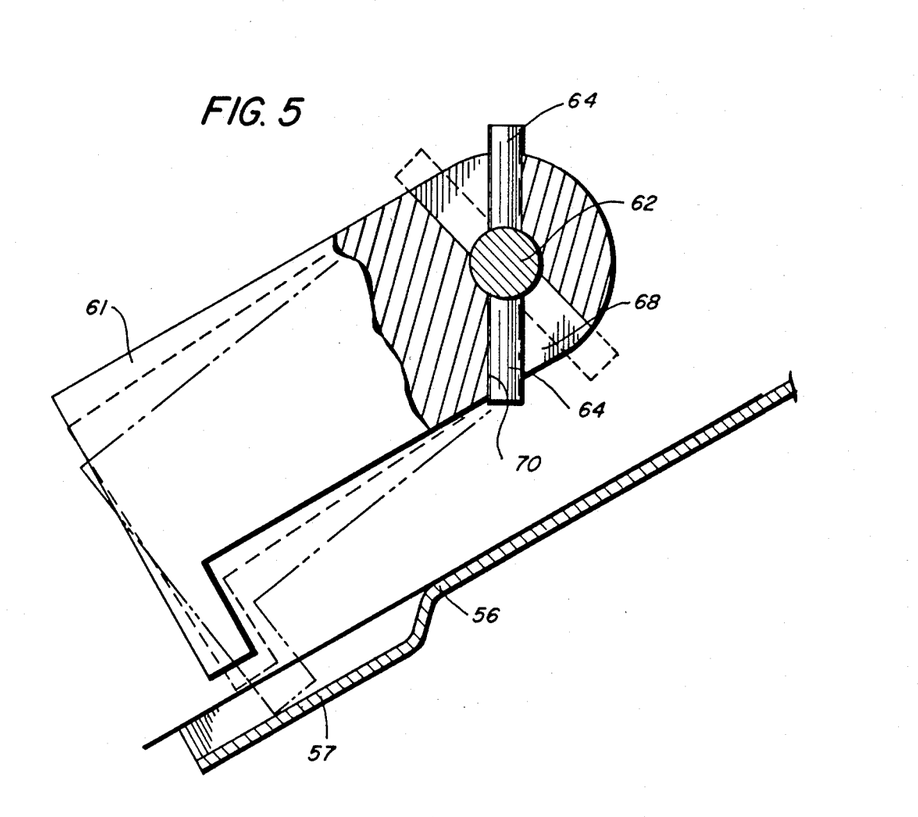
FIG. 5 is an enlarged side view of the gate on a shaft showing the mechanism which permits the floating gate.

The mechanism to permit the gate to float on a sheet which is being fed from the inclined stacking chute is illustrated in FIG. 5. The gate 61 which is mounted to gate shaft 62 is positively driven clockwise when the shaft 62 is rotated clockwise by the action of solenoid 63 through linkage 65. The shaft pin 64 extends through the center of shaft 62 and contacts the pin surface 70 of gate to rotate the gate clockwise up out of the path. When it is desired to close the gate, the shaft is rotated counterclockwise and the gate is permitted to fall by gravity and float against the surface with which it comes in contact. This happens because the pin 64 extended through the gate shaft into a very large arcuate pin opening 68 in the gate member itself.

Figure 4:
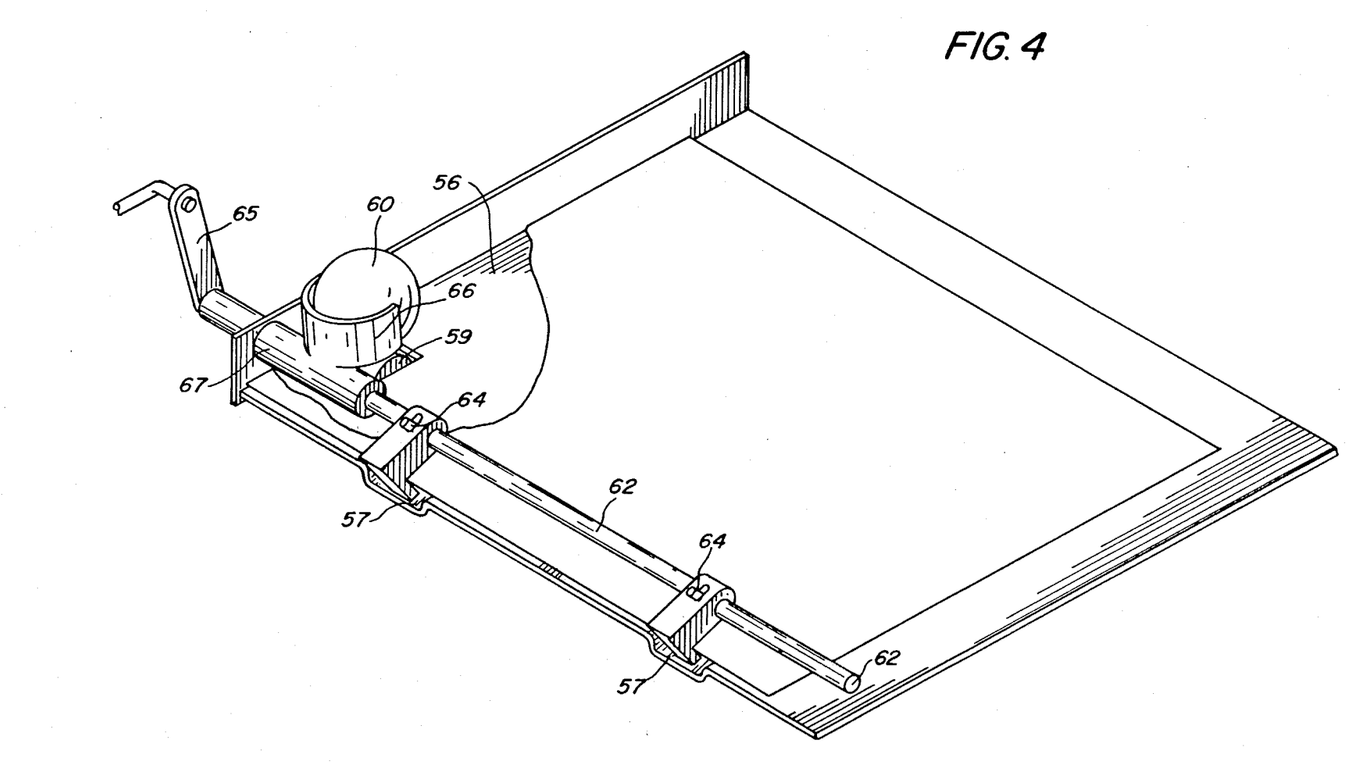
FIG. 4 is an enlarged side sectional view of the document loading chute, registration aid and gate.

Positioned in the middle of sheet support bottom 58 is start sensor 71 which is activated by inserting a sheet in the chute. Once activated the start sensor activates the registration aid device and since the gate is open the sheet is simultaneously registered and fed in a forward direction.

The action of the gate and registration aid permit loading and feeding a first document and while the first document is being fed the gate is permitted to float on it. A subsequent document can be loaded in the chute without being put in position to be fed when the first document has cleared the loading chute. In this way, the overlapping of successive documents is avoided and a constant inter document and inter copy gap may be achieved during the routine copying of successive sheets.

The principles of the present invention may be further appreciated by reference to its operation during the several different modes of opeation. When making a single copy as the user approaches the machine, the gate is open and the registration aid nip is closed. The first document, when dropped into the loading chute strikes start sensor 71 which activates the registration aid and the transport drive which tends to drive the document against the rear registration edge and forward into the nip of the first pair of transport rolls 42, 49. Since all the transport rolls 42-44 are driven at the same speed and the document is driven across the imaging platen 37 at the same speed, the transport mechanism is frequently referred to in the art as a constant velocity transport. As the leading edge of the first document exits the first set of transport rolls it contacts the registration sensor which activates the paper feeder so that a copy sheet arives at the transfer station synchronized to the image on the drum. After a fixed period of time following the first document striking the start sensor, the solenoid 63 is energized, the gate is released and comes down to float on the top of the trailing portion of the first document and the registration ball 60 is simultaneously retracted from the nip with driver roll 59. It is important to note that these events do not occur until the lead edge of the first document is in the nip of the first set of transport rolls 42, 49. Thereafter the first document is transported across the imaging platen and eventually into the document restack tray. If only one document is to be fed and only one copy is made prior to machine shut down the solenoid is deenergized, the gate is open and simultaneously the registration aid roll nip is closed.

In the stream feeding mode of operation following the feeding of the first document as in the single copy mode described above, the gate is floating on the trailing portion of the first sheet and the registration aid nip is open. The second document is manually inserted into the loading chute and falls to the bottom where the lead edge is intercepted by the gate. When the trailing edge of the first document passes the registration sensor, the solenoid is deenergized, the gate retracted and the registration aid ball lowered into contact with driver roll. As with the first document the registration aid registers the document against the rear registration edge and drives it forward into the first set of transport rolls and after a fixed period of time, the gate is again closed by energizing the solenoid. In this way the interdocument and thereby the intercopy gap is maintained substantially constant and there is no possibility of successive documents overlapping.

In the multicopy mode of operation, the desired number of copies is selected on the machine control panel and the copier is placed in the multicopy mode of operation. The first copy is made in the same manner as described with reference to making a single copy except that after a given period of time has elapsed following the passage of the trailing edge past the registration sensor, the direction of all the transport rolls 42-45 is simultaneously reversed and the document is driven straight back in a substantially horizontal path past the loading chute exit to the horizontal transport. It should be noted that since the first document is not driven up the loading chute that the loading chute may be supplied with the next document thereby reducing the total time to make copies and increasing operator convenience. After the lead edge of the document which is being driven in a reverse direction is sensed by the registration sensor, the direction of all the drive rolls 42-45 is again reversed and the document is fed forward past the imaging platen to make a second copy. In this way successive copies of the same document may be made. After the last copy of the document is made the document is transported forward to the restack tray and as the trail edge of the first document passes the registration sensor the next document is released from the loading chute and fed forward in the manner described with respect to stream feeding. This also enables the machine to have a stream feeding multicopy mode of operation.

For copying pages of a book, the top frame portion is raised up exposing the imaging platen and only the lower transport rolls 42-45. The opened book is manually placed on the substantially horizontal transport plane near drive roll 44 and manually pushed forward. The transport rolls are not being driven at this time. The transport roll 44 has a one way clutch 47 so it can free wheel in the counterclockwise direction as the operator pushes the book forward. When the lead edge of the book reaches the sensor 54, the drive rolls 42-45 are activated and if the operator manually holds the book down or presses slightly on the book so that the book contacts the drive rolls, the drive rolls will drive the book forward over the imaging platen at the proper speed. While the above procedure is repeated for each copy made from a book it should be noted that in an alternative embodiment the transport rolls 42-45 could be arranged to drive the book in a reverse direction after the first copy has been made in preparation for making a second copy in much the same way as described with reference to the multicopy mode of operation described above.

With reference to the above modes of operation it will be understood that as with any automatic reproducing apparatus all the timed machine operations are activated, inactivated or controlled by a machine controller in conventional manner such as is schematically illustrated in FIG. 2.

As may be appreciated from the above description, the present invention provides a simple sheet feeding device. It is very convenient to use and prevents overlapping of the documents being fed. In addition, it provides a wait station for the second document to be fed while the first document is being fed. Furthermore, with the recess in the chute, it allows the gate to push down against the first sheet being fed below the level of the chute so that the natural beam strength of the second sheet being placed in the chute will hold the level of the second sheet above the gate.

Figure 6:
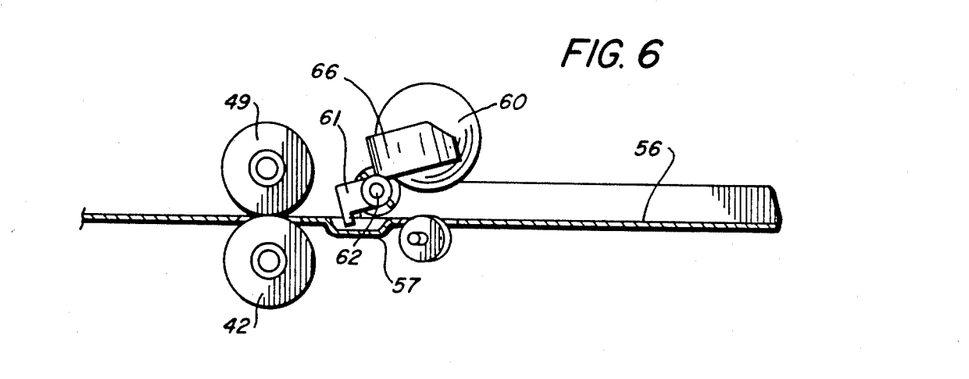
FIG. 6 is a side sectional view of an alternative embodiment of the present invention wherein the sheet loading chute is substantially horizontally oriented.

While the invention has been described with reference to the specific embodiment illustrated wherein the chute is inclined to the horizontal, it should be understood that the chute mechanism functions equally well when the chute is substantially horizontally oriented as it may be generally depicted with reference to FIG. 6. While a feed means is only preferable to be used in the chute when the chute is vertically inclined to the horizontal, it should be noted that a feed device is required when the chute is substantially horizontally oriented since there is no force of gravity to gently feed the first sheet along the sheet feeding path. Furthermore while the present invention has been illustrated with reference to use in a multimode document handler for an automatic reproducing machine, it will be understood that it has equal application in the general application of feeding sheets in any environment. Accordingly it is intended that this alternative and other alternatives, modifications and variations as will become apparent to one skilled in the art shall be embraced by the present disclosure as may fall within the spirit and scope of the appended claims.

I claim:

1. A device for feeding successive sheets without overlapping the sheets, comprising a sheet loading chute for supporting and guiding individual sheets, said loading chute comprising a sheet support bottom having a recess formed therein at the exit of the chute and pivotally mounted retractable gate means at the exit end of said chute which when in the closed position extends into said chute recess, means to retract said gate so that a sheet may be fed from said loading chute in a forward direction, means to release said gate from said retracted position after the leading edge of the sheet has passed the closed position of the gate means and before the trailing edge of the sheet has passed the closed position of the gate means, said release means permitting said gate to float against the sheet in the recessed portion of the chute whereby when the trailing edge of said sheet being fed passes under the gate said gate drops by its own weight into the chute recess thereby blocking passage in a forward direction of a successive sheet.

2. The sheet feeding device of claim 1 including means to feed a sheet from said chute.

3. The sheet feeding device of claim 1 wherein said chute is inclined to the horizontal and said sheet initially passes from said chute by the force of gravity.

4. The sheet feeding apparatus of claim 1 wherein said sheet support bottom is planar and said recess in said sheet support has a planar bottom.

5. The sheet feeding device of claim 1 wherein said chute is substantially horizontal.

6. A device for feeding successive sheets without overlapping the sheets, comprising a sheet loading chute for supporting and guiding individual sheets, said loading chute comprising a sheet support bottom having a recess formed therein at the exit of the chute, and pivotally mounted retractable gate means at the exit end of said chute which when in the closed position extends into said chute recess, said gate means comprising at least one finger pivotally mounted on a shaft such that when the shaft is rotated in one direction, the gate is positively pivotally retracted and that the shaft is only partially rotatable in the opposite direction, and including means to permit said gate to float of its own weight against said chute, means to retract said gate so that a sheet may be fed from said loading chute in a forward direction, means to release said gate from said retracted position after the leading edge of the sheet has passed the closed position of the gate means and before the trailing edge of the sheet has passed the closed position of the gate means, said release means permitting said gate to float against the sheet in the recessed portion of the chute whereby when the trailing edge of said sheet being fed passes under the gate said gate drops by its own weight into the chute recess thereby blocking passage in a forward direction of a successive sheet.

7. The sheet feeding apparatus of claim 6 wherein said means to permit said gate to float comprises means to isolate the rotational drive of the shaft from the gate member which comprises a slot through said shaft and said gate member mounted on said shaft, said slot in said gate member being substantially larger than in said shaft, a pin of generally constant diameter through said slot in said shaft and into the slot in said gate member whereby said gate member is floatingly positioned on said shaft by virtue of its own weight.

8. The sheet feeding device of claim 6 wherein said chute is inclined to the horizontal and said sheet initially passes from said chute by the force of gravity.

9. The sheet feeding apparatus of claim 6 wherein said sheet support bottom is planar and said recess in said sheet support has a planar bottom.

* * * * *